(12) United States Patent  
Tesar

(10) Patent No.: US 7,081,062 B2
(45) Date of Patent: Jul. 25, 2006

(54) STANDARDIZED ROTARY ACTUATOR

(76) Inventor: Delbert Tesar, 8005 Two Coves Dr., Austin, TX (US) 78730

( * ) Notice: Subject to any disclaimer, the term of this patent is extended or adjusted under 35 U.S.C. 154(b) by 0 days.

(21) Appl. No.: 10/714,183

(22) Filed: Nov. 14, 2003

(65) Prior Publication Data

US 2004/0102274 A1 May 27, 2004

Related U.S. Application Data

(60) Provisional application No. 60/429,276, filed on Nov. 25, 2002.

(51) Int. Cl.
F16H 23/00 (2006.01)
F16H 59/00 (2006.01)
F16H 1/32 (2006.01)

(52) U.S. Cl. .................... 475/163; 475/5; 475/180

(58) Field of Classification Search ................ 74/437, 74/461–62; 475/5, 163, 176–180, 341, 344
See application file for complete search history.

(56) References Cited

U.S. PATENT DOCUMENTS

| 276,776 A | 5/1883 | Clemons |
| 474,903 A | 5/1892 | Cottrell |
| 546,249 A | 9/1895 | Regan |
| 908,529 A | 1/1909 | Williams |
| 978,371 A | 12/1910 | Harrison |
| 1,009,954 A | 1/1911 | De Briones |
| 987,430 A | 3/1911 | Conant |
| 1,192,627 A | 7/1916 | Hatlee |
| 1,217,427 A | 2/1917 | Fast |
| 1,282,172 A | 10/1918 | Beirns |
| 1,313,537 A | 8/1919 | Jones |
| 1,499,763 A | 7/1924 | Davis |
| 1,514,938 A | 11/1924 | Taub |
| 1,590,166 A | 6/1926 | Howard |
| 1,601,750 A | 10/1926 | Wildhaber |
| 1,641,766 A | 9/1927 | Laukhuff |
| 1,693,154 A | 11/1928 | Newmann |
| 1,694,031 A | 12/1928 | Braren |
| 1,735,662 A | 11/1929 | Trevino |
| 1,767,866 A | 6/1930 | Wildhaber |
| 1,770,035 A | 7/1930 | Heap et al. |
| 1,831,903 A | 11/1931 | Chrisman et al. |
| 1,844,471 A | 2/1932 | Johnson |
| 1,942,795 A | 1/1934 | Benson |
| 2,026,880 A | 1/1936 | Fliesberg et al. |
| 2,037,787 A | 4/1936 | Hughes |
| 2,049,696 A | 8/1936 | Fliesberg |
| 2,084,844 A | 6/1937 | Harris .................... 74/305 |

(Continued)

FOREIGN PATENT DOCUMENTS

GB 2271025 3/1994

OTHER PUBLICATIONS yet2.com, TeckPak, Traction electric motor (generator) in an epicyclic configuration, Aug. 9, 2002, 6 pp.

(Continued)

Primary Examiner—Roger Pang

(57) ABSTRACT

A rotary actuator incorporating a shell, an output plate and a cross-roller bearing retaining the output plate within the shell. A prime mover, disposed within the shell, exerts torque on a gear train within the shell. A pair of gears, disposed on either side of the cross-roller bearing, mesh with one or more gears in the geartrain. Depending on the application, the geartrain may be a planetary epicyclic or an eccentric hypocyclic type.

7 Claims, 11 Drawing Sheets

U.S. PATENT DOCUMENTS

| | | | |
|---|---|---|---|
| 2,108,384 A | 2/1938 | Moisy | |
| 2,168,164 A | 8/1939 | Kittredge | |
| 2,170,951 A | 8/1939 | Perry | |
| 2,250,259 A | 7/1941 | Foote, Jr. | |
| 2,303,365 A | 12/1942 | Karlsen | |
| 2,382,482 A | 8/1945 | Henry | |
| 2,475,504 A | 7/1949 | Jackson | |
| 2,481,627 A | 9/1949 | Sharpe | |
| 2,482,568 A | 9/1949 | Werner | |
| 2,495,811 A | 1/1950 | Hollmann | |
| 2,666,336 A | 1/1954 | Gerotors | |
| 2,677,288 A | 5/1954 | Gnahrich | |
| 2,709,929 A | 7/1955 | Godwin | |
| 2,748,616 A | 7/1956 | Foster et al. | |
| 2,837,937 A | 6/1958 | Kraus | |
| 2,881,619 A | 4/1959 | Fox et al. | |
| 2,922,294 A | 1/1960 | Wildhaber | |
| 2,966,078 A | 12/1960 | Wright | |
| 2,972,910 A | 2/1961 | Menge | |
| 3,011,304 A | 12/1961 | Sundt | |
| 3,019,705 A | 2/1962 | Wilkinson | |
| 3,028,513 A | 4/1962 | Sundt | |
| 3,037,400 A | 6/1962 | Sundt | |
| 3,056,315 A | 10/1962 | Mros | |
| 3,144,791 A | 8/1964 | Menge, Sr. | |
| 3,160,032 A | 12/1964 | Black | |
| 3,192,799 A | 7/1965 | Pamplin | |
| 3,304,795 A * | 2/1967 | Rouverol | 74/411 |
| 3,307,434 A | 3/1967 | Kope | |
| 3,413,896 A | 12/1968 | Wildhaber | |
| 3,424,036 A | 1/1969 | Golgan | |
| 3,427,901 A | 2/1969 | Wildhaber | |
| 3,429,393 A | 2/1969 | Lorence | |
| 3,451,290 A | 6/1969 | Wildhaber | |
| 3,546,972 A | 12/1970 | Morozumi | |
| 3,602,070 A * | 8/1971 | Verge et al. | 475/177 |
| 3,705,522 A | 12/1972 | Ogawa | 74/803 |
| 3,766,790 A | 10/1973 | Weir | |
| 3,903,750 A | 9/1975 | Takasu | |
| 3,924,478 A | 12/1975 | Takasu | |
| 3,975,973 A | 8/1976 | Haase | |
| 4,016,780 A | 4/1977 | Baranyi | |
| 4,023,441 A | 5/1977 | Osterwalder | |
| 4,095,150 A | 6/1978 | Senckel | 318/227 |
| 4,155,276 A | 5/1979 | Fengler | |
| 4,243,355 A | 1/1981 | Brudi et al. | |
| 4,270,401 A | 6/1981 | Davidson | |
| 4,452,102 A | 6/1984 | Shaffer | |
| 4,512,213 A | 4/1985 | Newton | |
| 4,603,594 A | 8/1986 | Grimm | |
| 4,604,916 A * | 8/1986 | Distin, Jr. | 475/168 |
| 4,614,128 A | 9/1986 | Fickler | |
| 4,679,485 A | 7/1987 | Nelson et al. | |
| 4,745,815 A | 5/1988 | Klopfenstein | |
| 5,030,184 A | 7/1991 | Rennerfelt | |
| 5,039,900 A | 8/1991 | Nashiki et al. | |
| 5,136,201 A | 8/1992 | Culp | |
| 5,144,851 A | 9/1992 | Grimm et al. | |
| 5,214,972 A | 6/1993 | Larson et al. | |
| 5,232,412 A | 8/1993 | Zheng et al. | |
| 5,277,672 A | 1/1994 | Droulon et al. | |
| 5,295,925 A | 3/1994 | Hirabayashi | |
| 5,313,852 A | 5/1994 | Arena | |
| 5,324,240 A | 6/1994 | Gittinger | |
| 5,505,668 A | 4/1996 | Koriakov-Savoysky | |
| 5,633,554 A | 5/1997 | Kaji | |
| 5,685,694 A | 11/1997 | Jones et al. | |
| 5,692,989 A | 12/1997 | Kamlukin | 475/346 |
| 5,695,425 A * | 12/1997 | Hashimoto et al. | 475/180 |
| 5,704,864 A * | 1/1998 | Yanagisawa | 475/149 |
| 5,809,837 A | 9/1998 | Shaffer | |
| 5,910,066 A | 6/1999 | Schulz et al. | |
| 5,957,798 A | 9/1999 | Smith, III et al. | |
| 5,957,804 A | 9/1999 | Schulz et al. | |
| 5,964,154 A | 10/1999 | Michalik | |
| 5,990,587 A | 11/1999 | Shimanovich et al. | |
| 6,034,466 A | 3/2000 | Blanding et al. | |
| 6,098,479 A | 8/2000 | Hoermansdoerfer | |
| 6,102,827 A | 8/2000 | Teasdale et al. | |
| 6,107,726 A | 8/2000 | Near et al. | |
| 6,123,640 A | 9/2000 | Schulz | |
| 6,158,295 A | 12/2000 | Nielsen | |
| 6,184,608 B1 | 2/2001 | Cabuz et al. | |
| 6,192,321 B1 | 2/2001 | Grumstrup et al. | |
| 6,220,984 B1 | 4/2001 | Schulz et al. | |
| 6,244,843 B1 | 6/2001 | Kosuge | |
| 6,269,702 B1 | 8/2001 | Lambson | |
| 6,294,859 B1 | 9/2001 | Jaenker | |
| 6,307,301 B1 | 10/2001 | Ngo et al. | |
| 6,313,568 B1 | 11/2001 | Sullivan et al. | |
| 6,679,801 B1 * | 1/2004 | Nohara et al. | 475/179 |
| 6,743,137 B1 * | 6/2004 | Rilbe | 475/163 |
| 2003/0027681 A1 | 2/2003 | Kakeno | 475/339 |

OTHER PUBLICATIONS

The "Quadrant Drive" Speed Reducer Drive System, copyright date unknown, 4 pp. info@plumettaz.ch.

Darali Cycloidal Reducers, ISO-9002, Cyclo0idal Advantage, 11 pp.

Mectrol—Products Information: Reducers: Features and Benefits, Jun. 17, 2002, 4 pp.

Sharke, Paul, The start of a new movement, Mechanical Engineering, Aug., 2002, 4 pp., Surrey BC Canada.

Ikona Gear Technologies, Inc. Information, 7 pp., ikonagear.com.

* cited by examiner

STANDARDIZED ROTARY ACTUATOR

CROSS REFERENCE TO RELATED APPLICATION

This application claims the priority of U.S. Provisional Patent Application Ser. No. 60/429,276, filed Nov. 25, 2002.

TECHNICAL FIELD OF THE INVENTION

The present invention relates in general to rotary power devices, and specifically to rotary actuators for use in automated machinery.

BACKGROUND OF THE INVENTION

Most automated mechanical systems developed today are built as unique custom one-off systems employing little or no standardized architecture. This one-off design methodology tends to result in systems exhibiting relatively high cost and a low rate of change and diffusion of new technology.

Another undesirable effect of custom mechanical design methodology is rapid obsolescence. In general, operator interfaces are cumbersome, maintenance training is complex, and the logistics trail for maintenance is a permanent and expensive user obligation.

Often, the designer of an automated mechanical system is first faced with the design of a machine joint, which, owing to the relative absence of standardized machine joint solutions, must be performed beginning from basic structural components, such as plates, beams, and bearings.

Given a machine joint of sufficient rigidity, the machine designer then moves to specification and selection of a prime mover, a power source for the prime mover, positional and velocity feedback sensors for the joint, a control system for the prime mover, all necessary wiring, and any necessary intermediate geartrain and power transmission elements. Generally, these components will be discrete components. Although certain components may be designed to interface with the related components, a relatively high degree of engineering effort must still be exerted to ensure that the various components will work together properly under a variety of operating conditions.

One area in which integration has been effectuated with some degree of success is integration of the prime mover and the gear train. Modules incorporating both a prime mover and a gear train are known as "gearmotors" or "gearhead motors." Although somewhat successful, this integration has suffered from the use of inadequate gear train designs, thereby limiting the overall effectiveness of such modules.

Development work in gear trains has been largely stagnant for many years, with the conventional wisdom being that all the science available has borne all the results that are feasible. Generally, system designers would prefer to eliminate the gear train entirely, along with its weight, backlash, noise, cost, and presumed complexity.

Hypocyclic gear trains were first developed and patented in the late nineteenth century. A further surge in patenting occurred in the mid-1930s. Several industrial manufacturers presently produce gear transmissions using hypocyclic gear trains, but their designs mimic older designs, which contain many parts and bearings, a circuitous force path, and two opposing wobble plate gears, for balancing purposes. The balancing issue has limited, to a certain extent, the use of wobble gear designs, but so long as the driving eccentric for these gears is relatively small, on the order of 3% or less, they can be well-balanced using modern methods of precision balancing.

In some hypocyclic gear trains produced presently, only one wobble plate gear mesh is used. These designs use pins through the plates to transmit torque to the output plate, adding a further level of complexity and a number of dimensions having critical tolerances.

For perhaps thirty years, a low level of interest has been shown in the design of hypocyclic motors with the claim that they produce high torque at low speeds. They do, but no one has heretofore found a satisfactory means to get that high torque to a concentric rotating output shaft.

At least three principal variations of cycloidal drive gear trains currently exist. These include the designs produced by SUMITOMO™ (Japan), TEIJIN SEIKI™ (Japan) and ANDANTEX™ (France). These designs all depend on dual wobble plate differencing gears, set 180 degrees out of phase for balancing, driven either by a precision cycloidal surface or a dual set of eccentrics. The force path for these devices between input and output is long and circuitous, requiring a large, and very heavy, hoop structure to keep all the forces contained.

These devices use rollers on curved surfaces and cantilevered pins to provide the final drive to their output plates. Also, this type of drive is connected to a small output shaft supported by additional bearings. All of this adds considerably to the compliance and lack of rigidity of the gear train. Because of their unique geometry, complexity, volume and weight, these gear trains are very difficult to integrate into self-contained actuator modules.

SUMMARY OF THE INVENTION

As discussed above, automated mechanical systems are generally custom, one-off systems designed essentially from the ground up. The inventor of the standardized rotary actuator module described herein believes that the level of custom engineering required for the implementation of a motion control system can be drastically reduced through the development and use of standardized modules of the type described herein.

As a solution to the 'custom design' dilemma for automated machines, the inventor suggests the implementation of an open architecture, using standardized building blocks, including standardized actuators, links, end-effector tools, controllers, and related components, which can be assembled on demand and operated by standardized operating system software.

To this end, the present invention is an integrated standardized rotary actuator incorporating a prime mover, a gear train, and a rotary machine joint in a single package. These elements are integrated into a single self-contained module that is easily scaleable to meet a wide variety of application demands. The rotary actuator may incorporate as few as five principal parts fitted with a minimum of critical tolerances, resulting in a system that is substantially insensitive to tolerance and temperature variations.

In certain embodiments, the rotary actuator modules of the present invention may be produced in standardized geometries and sizes. An appropriate set of standardized sizes facilitates the standardization of machine architecture accordingly. This standardization enables the machine designer to assemble or reconfigure machines on demand, in a similar manner to that employed presently for the configuration of personal computers. The use of standards enables the diffusion of new technology, tending to increase performance while decreasing costs.

One object of the present invention is to create a standardized rotary actuator which can be mass produced at low cost, low weight and low volume, and still maintain a high level of performance. Various levels of ruggedness—for example, light, medium, and heavy—may be developed for various applications.

The present invention is a new high-performance rotary actuator in a variety of embodiments sharing certain characteristic features. In general, a high level of performance can be preserved even for low cost versions of the present invention. Depending on the application, each of the embodiments incorporates features generating one or more of certain advantages.

The novel design of certain embodiments of the present invention provide simplicity of design using a minimal number of parts and a minimized list of parameters, thereby allowing for a relatively small form factor exhibiting exceptional compactness, stiffness and load capacity, along with quiet and efficient operation. They can be designed for easy assembly, ideal for mass production at various quality levels.

Certain embodiments of the present invention may be especially useful in low speed and high torque applications of the type found in dextrous machines having complex duty cycles. Examples of these types of applications include those found in robots, manufacturing cells and aircraft actuators.

The rotary actuators described herein have the potential to be more compact, simpler, more easily assembled and less expensive than any rotary actuator developed before. These devices may also be configured to exhibit lower inertia and provide higher stiffness than any rotary actuator developed before.

In a first embodiment, the present invention is a rotary actuator incorporating an actuator shell having a planetary cage disposed therein. A prime mover having a first prime mover portion rigidly fixed to the actuator shell and a second prime mover portion, adjacent to, and movable with respect to, the first prime mover portion, is rigidly fixed to the planetary gear cage. A cross-roller bearing locates an output attachment plate within the shell. A shell gear is rigidly fixed to the actuator shell and an output gear is rigidly fixed to the output attachment plate. One or more planetary gears, disposed in the planetary cage, each have a first gear portion meshed to the shell gear and a second gear portion, adjacent to the first gear portion, meshed to the output gear.

In a second embodiment, the present invention is a rotary actuator incorporating an actuator shell with an eccentric cage and prime mover disposed therein. One portion of the prime mover is rigidly fixed to the shell, while a second portion is rigidly fixed to the eccentric cage. A cross-roller bearing secures an output attachment plate within the shell. A shell gear is rigidly fixed to the actuator shell, and an output gear is rigidly fixed to the output attachment plate. An eccentric, disposed about the eccentric cage, has a first gear portion meshed to the shell gear and a second gear portion, adjacent to the first gear portion, meshed to the output gear.

In a third embodiment, the present invention is a rotary actuator incorporating an actuator shell having a prime mover and a two stage planetary gearset disposed therein. The prime mover is connected to rotate the planet gear cage of the first stage of the gearset with respect to the actuator shell. A shaft, having a shaft gear rigidly fixed thereto, is disposed within the actuator shell.

Also in this third embodiment, a second planetary gear cage, rotatable with respect to the first planetary gear cage and the shaft, has a cage gear rigidly fixed thereto. One or more first stage planetary gears disposed in the first planetary gear cage, each have a first gear portion meshed to the shaft gear and a second gear portion, adjacent to the first gear portion, meshed to the cage gear. A cross-roller bearing secures an output attachment plate within the shell.

In order to facilitate the communication of mechanical power out of the actuator, a shell gear is rigidly fixed to the actuator shell and an output gear is rigidly fixed to the output attachment plate. Finally, one or more second stage planetary gears are disposed in the second planetary gear cage, each having a first gear portion meshed to the shell gear and a second gear portion, adjacent to the first gear portion, meshed to the output gear.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

Figure 1:
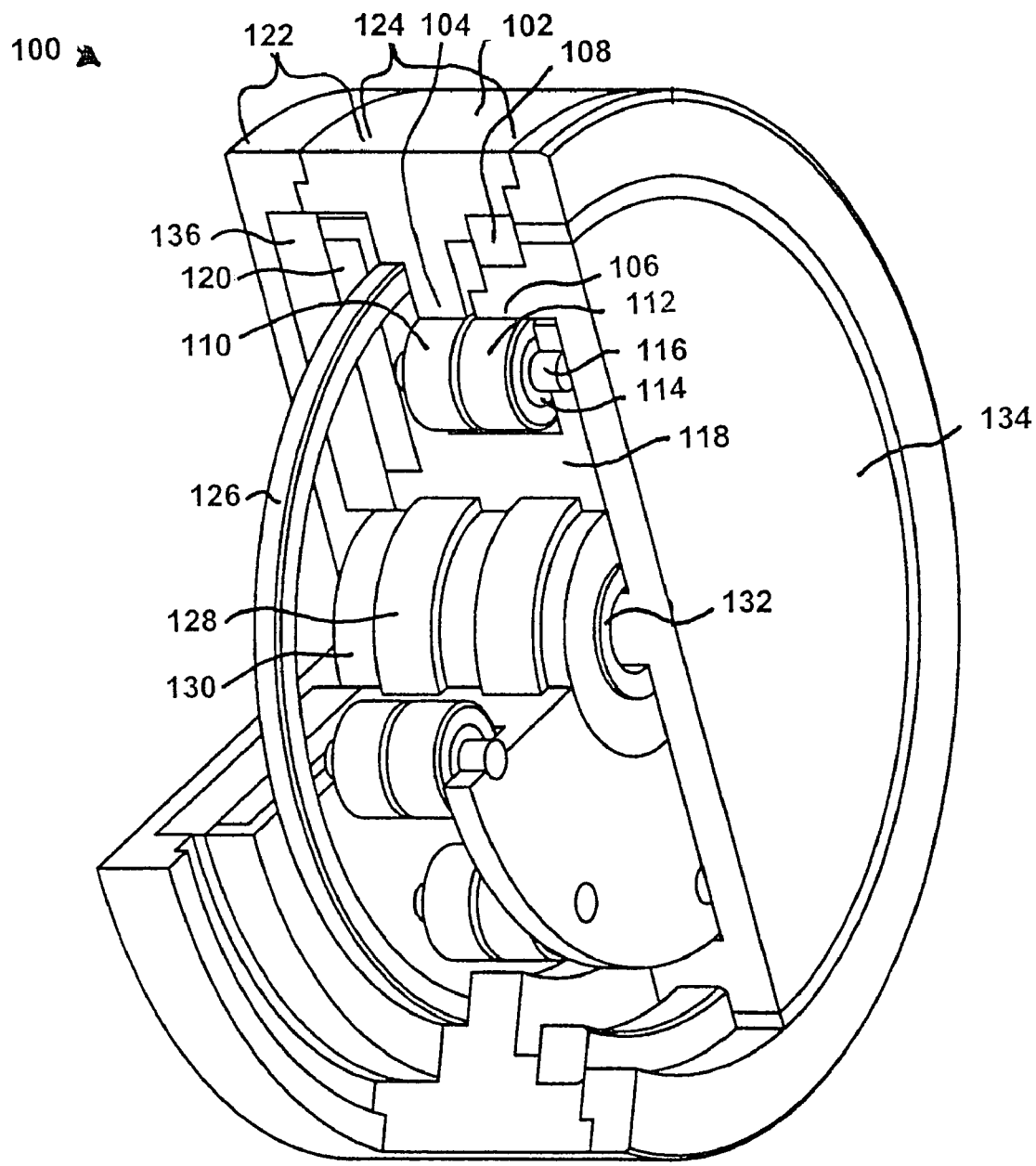
FIG. 1 is a cutaway isometric view of a rotary actuator in accordance with one embodiment of the present invention.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not delimit the scope of the invention.

Certain embodiments of the present invention are standardized rotary actuators which can be mass produced at low cost and still maintain a high level of performance. Various levels of ruggedness—for example, light, medium, and heavy—may be employed for various applications. In fact, certain of the actuator concepts described herein will be found sufficiently rugged in their basic design that parts made of plastic or formed metal can be used to reduce cost while still providing a highly-versatile actuator useful in a variety of applications. These applications may include, but are not limited to, portable tools, educational robots, toys, and automobiles.

The present invention is a new high-performance rotary actuator in a variety of embodiments sharing certain characteristic features. Depending on the application, each of the embodiments incorporates features generating one or more of certain advantages.

The novel design of certain embodiments of the present invention provide simplicity of design using a relatively small number of parts and a minimized list of parameters, thereby allowing for a relatively small form factor exhibiting exceptional compactness, stiffness and load capacity, along with quiet and efficient operation. They are designed for easy assembly, ideal for mass production at various quality levels.

In general, these actuators are of exceptionally rugged design, exhibiting relative insensitivity to temperature and tolerance effects. The actuators of the present invention incorporate a relatively short force path across a high-stiffness cross roller bearing, thereby maximizing stiffness and strength. In certain embodiments, the actuators of the present invention incorporate standardized attachment architectures.

In order to promote standardization, the rotary actuator of the present invention can be configured to serve as a standardized "building block" within a system. Such a building block may, for example, be intelligent and adaptable, provide for a maximum performance envelope, be compact and rugged, be optimized in its structural design, provide standardized interfaces for quick replacement by technicians anywhere in the world, and be produced in large enough quantities to take advantage of economies of scale in manufacturing.

Prime mover requirements may be met either by D.C. brushless motors or switched reluctance motors, either in cylindrical or pancake format. The gear trains may be made unique, compact, rugged and cost effective under production in large quantities.

In certain embodiments, cross-roller bearings are used to form the joint bearings themselves. Cross-roller bearings are selected not only for their stiffness but also owing to their proper geometric configuration. In certain embodiments, the cross-roller bearing acts as the principal gear train bearing at the same time. Precision large and small-scale actuators can be used separately or combined to satisfy demanding positional accuracy requirements.

In manufacturing cells, the rotary actuator modules of the present invention may be used directly as simple transfer devices, drivers of conveyers, or joint actuators in 2 degree-of-freedom manipulators. At the other end of the complexity continuum, highly dextrous manipulators having 10 degrees of freedom and above can be assembled on demand. Each of the above systems could be assembled as needed, all with the same interfaces, and all with the same maintenance requirements, perhaps from only 5 basic sizes in each cell application, and all driven by one universal software package to reduce cost, increase performance, and to open up the architecture of such systems.

FIG. 1

FIG. 1 depicts an isometric cutaway view of a rotary actuator 100 in accordance with one embodiment of the present invention. Rotary actuator 100 shown in FIG. 1 may be configured to be very rugged, having high levels of both stiffness and shock resistance.

A rotary actuator such as rotary actuator 100 can have a number of geometrical configurations. In one such configuration, a rotary actuator has a "pancake" geometry, being relatively narrow in thickness along its centerline and relatively large in diameter. Rotary actuator 100 shown in FIG. 1 has such a geometry. In alternate embodiments, a rotary actuator may have a "coffee can" geometry, being relatively wide along the centerline and relatively small in diameter. Rotary actuator 200 shown in FIG. 2 has this type of geometry.

Generally, the pancake version is driven by a switched reluctance motor (SRM) and optimized to produce higher torques at lower speeds. The "coffee can" version is generally optimized for use in slim/dexterous machines such as serial robot manipulators. This version is usually driven by a brushless D.C. motor of somewhat lower torque and higher speed ranges as compared to the SRM.

In general, it is desirable to satisfy as many design objectives as possible while at the same time minimizing complexity. This combination of design criteria argue in favor of combining functions when possible. In certain embodiments, the rotary actuator of the present invention is constructed so as to not merely provide rotary power to a joint, but to function as the joint itself, incorporating sufficient structural rigidity as to make additional rotary bearing structure extraneous.

In certain embodiments, the incorporation of quick-change interfaces into the input/output attachment structures of the rotary actuators provides the designer with the ability to assemble machines on demand. The geometry of one embodiment of such a quick-change interface is described in detail in connection with FIG. 8, below. In certain embodiments, the self-contained actuator may incorporate 80% or more of the machine's complexity, including electronics, brakes, buses, sensors, bearings, motor, gear train, and all necessary attachments and interfaces.

Rotary actuator 100 makes use of internal bull gear 104 and sun gear 106 as part of the attachment components of the rotary actuator 100, separated by a principal cross roller bearing 108. The bull gear 104 and sun gear 106 are driven by planet gears 110 and 112 supported by bearings 114 on press fit shafts 116 passing through the sides of the planet cage 118.

Because the bull gear 104 and sun gear 106 are part of the structure of the rotary actuator 100, the required weight goes down while the stiffness goes up. Also, because this design employs a large diameter cross-roller bearing 108, the structural stiffness of the rotary actuator 100 is also greatly improved. In certain embodiments, the bearing races can be machined directly into the bull gear 104 and/or sun gear 106 so as to improve the structural integrity of the design. A ball bearing may be used in place of cross-roller bearing 108 in less-demanding applications. Accordingly, the structure of the rotary actuator 100 can be made much smaller, lighter in weight, and more cost effective, through a reduction in the number of parts and simplified assembly. The planets 110 and 112 may be used in a Ferguson paradox gear train mechanism to further improve manufacturing simplicity.

Magnet disk 120 of the prime mover 122 is rigidly attached to the planet cage 118 to form the simplest possible configuration between the prime mover 122 and the gear train 124. Planet cage 118 and magnet disk 120 are supported by bearing 126 in the bull gear 104 and needle bearings 128 on stationary shaft 130. This design provides a very rugged support for the moving structure of rotary actuator 100 so as to best resist shock.

Planet cage 118 can be made lighter in order to reduce inertia in cases where additional responsiveness is desirable. The number of planets 110 and 112 may be as small as 2 or as large as 9 depending on the relative dimensions, speed, desired stiffness, inertia requirement, tooth sizing required for loading, and other factors.

Bearing 132 on shaft 130 is used to provide additional support to the output attachment plate 134 of rotary actuator 100. Where stiffness is an important consideration, the attachments to the neighboring structures on shell 102 and plate 134 may be placed in close proximity to bearing 108 in order to maximize the resulting structural stiffness of the system. In rotary actuator 100, field 136 is larger than magnet disk 120. This additional size accommodates end turns in the field 136.

FIG. 2

The switched reluctance motor (SRM) geometry shown in FIG. 1 is designed to maximize torque, and this design may be optimized for applications wherein high rotational speed is not a principal concern. A wide variety of aspect ratio considerations may be met employing both the SRM and DC prime movers. Given a cylindrical prime mover such as a D.C. brushless motor of higher relative speed and lower relative torque as compared to the switched reluctance motor, the geometry of actuator 100 can be modified into a coffee can geometry having all the other attributes of the pancake-shaped rotary actuator 100. Such an actuator is shown in FIG. 2 and generally designated 200.

In one embodiment, rotary actuator 200 may operate at speeds as much as ten times higher, but produce ten times less torque, than rotary actuator 100 of FIG. 1. In rotary actuator 200, there is a much higher concern for inertia in the moving structure and less concern for stress in the gear teeth due to a lower expected torque capacity.

Figure 2:
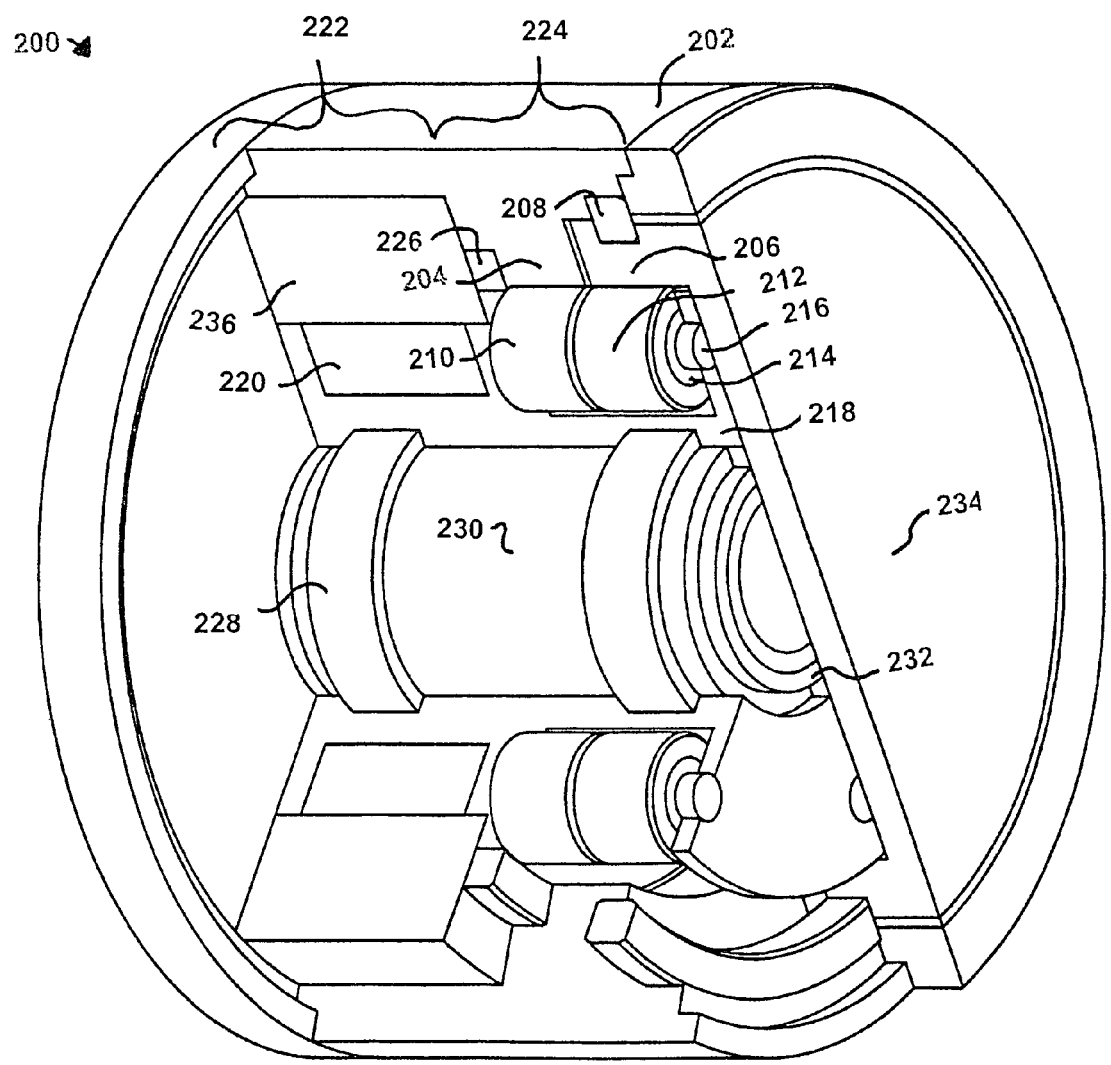
FIG. 2 is a cutaway isometric view of a rotary actuator in accordance with a second embodiment of the present invention.

FIG. 2 depicts rotary actuator 200 in an isometric cutaway view. Rotary actuator 200 is typically longer than rotary actuator 100, and there is more concern for the stiffness of the planet cage 218. Accordingly, additional support is provided by bearing 226, embedded in the stiff attachment shell 202 of actuator 200. In order to simplify the design of rotary actuator 200, the planets 210 and 212 are supported by bearings 214 which ride on shafts 216, which are press fit into the planet cage 218 to further increase the stiffness of planet cage 218.

The output attachment plate 234 and central stationary shaft 230 are mutually supported by bearing 232. Generally, because of higher velocities in the D.C. motor, the structure of the planet cage 218 will be lightened to reduce inertia and the bearings 208, 214, and 226 will be chosen for this higher velocity regime.

As will be appreciated by those of skill in the art, additional planets tend to increase stiffness, reduce backlash, and improve positional accuracy at the expense of complexity and increased inertia. Large gear train ratios require the use of multiple stages or Fergeson Paradox type epicyclic gear trains. Generally, the planet gear cage will represent the most complex part of the rotary actuator, adding to cost, complexity, and assembly issues.

In alternate embodiments, compound gears can be used in certain cases. Such gear trains incorporate, however, inherent limitations. These types of gear trains can give a realistic reduction of no greater than 10 to 1. Further, these gear trains tend to exhibit considerable backlash and have high rotary inertia. Finally, they are insufficiently rigid in rotary compliance, are heavy and are not space efficient.

Accordingly, epicyclic gear trains are better for rotary actuators because of their compatible geometry to the rotary prime mover. Unfortunately, these gear trains exhibit limitations as well. The maximum realistic gear reduction of such a mechanism is on the order of 100:1. Compound epicycle gear trains can, of course, provide reductions higher than 100:1 through the use of multiple stages. Compound gear trains, however, incorporate the limitations described above. In general, epicyclic gear trains exhibit a significant degree of backlash, require high tolerances, and are temperature sensitive. In fact, backlash generally must be designed in to account for temperature-related dimensional changes. Finally, the involute gear teeth used in epicyclic gear trains are often designed to be relatively tall, in order to maintain between one to two teeth in mesh. This geometry increases the loading at the root as well as sliding velocity, reducing both the strength and the efficiency of the mechanism.

In order to overcome the above limitations of epicyclic gear trains, elements are described below employing a single planet driven by an eccentric to make a "wobble" plate design while satisfying all the kinematic requirements normally associated with epicyclic gear trains.

FIG. 3

One object of the present invention is to make the standardized electro-mechanical actuator a simple continuum of design choices among switched reluctance or brushless D.C. motors and multi-planet or eccentric single planet hypocyclic gear trains. Ideally, each choice can be considered as a plug-in substitute for the other with no other primary design changes.

Accordingly, certain embodiments of the present invention may incorporate a single eccentric planet gear train in place of the multi-planet gear train used in FIGS. 1 and 2. The eccentric hypocyclic gear train incorporates a number of advantages, as described below.

In many embodiments, the actuators of the present invention incorporate a hypocyclic gear train, which may have a gear reduction ratio as high as 5000:1. These hypocyclic gear train assemblies may incorporate relatively short circular arc gear teeth, with up to 15 or more teeth in contact at a time.

The unique design characteristics of the hypocyclic gear trains provide reduced contact stresses, reduced bending stresses, lower sliding velocity, reduced energy loss, and the potential for preloading the mesh as the tooth comes into its central position.

Each gear tooth can be profiled to be slightly preloaded as it comes into its central position, in order to reduce the generation of lower-order harmonics and control backlash and lost motion. This preloading can be accomplished through the introduction of a slight interference between that tooth and the mating teeth as that tooth comes into its central position. In certain embodiments, a cavity may be introduced within each tooth in order to tailor the stiffness of the teeth and reduce closing noise.

Circular tooth profile gear trains exhibit a reduced degree of wear and noise, smooth and gradual load transfer among the teeth, and a reduced or eliminated necessity for critical tolerances, as circular arc teeth do not require the critical tolerances generally associated with involute teeth. A circular tooth profile can also exhibit increased strength, as clearances for external involute teeth are not required. Finally, in certain embodiments, a reduction in the sliding velocity between the mating gear teeth reduces the frictional losses within the mechanism.

Figure 3:
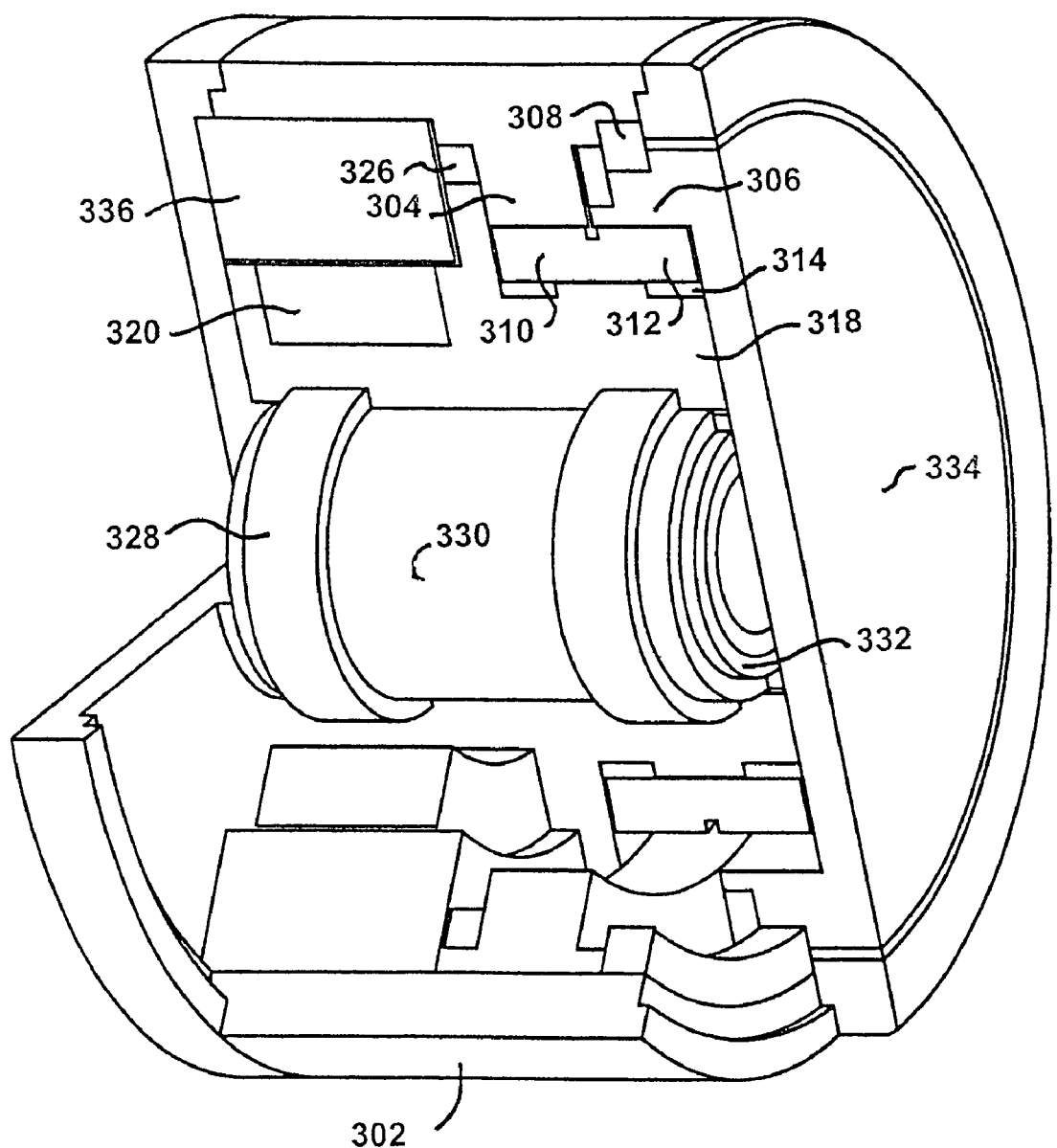
FIG. 3 is a cutaway isometric view of a rotary actuator in accordance with a third embodiment of the present invention.

FIG. 3 depicts a cutaway isometric of a rotary actuator 300 incorporating an eccentric hypocyclic gear train. Rotary actuator 300 incorporates a central stationary shaft 330 holding support bearings 328 that support the rotating motor armature 320 that drives the eccentric 218. Support bearings 314 on the eccentric 218 drive the wobble cylinder, which contains the planetary gears 310 and 312 that mesh with the bull gear 304 and sun gear 306 separated by the principal cross roller bearing 308.

Bull gear 304 is attached directly to the shell 302 of rotary actuator 300 while sun gear 306 is attached directly to the output attachment plate 334. The motor armature 336 is also held stationary by the actuator shell 302. End plate screws (not shown) assist in making the assembly rather direct, holding the stationary shaft 330 for support bearings 328.

Bearing 332 in the output attachment plate 334 supports the end of the stationary shaft 330. Seal 338 separates the output attachment plate 334 from the shell 302 and protects the cross roller bearing 308 from the elements. This design incorporates an additional bearing 326 to support the motion and force variation on the eccentric 318.

Rotary actuator 300 is notable for its inherent simplicity. The motor field 336 and armature 320, eccentric 318, planetary gears 310 and 312, bull and sun gears 304 and 306 and the principal roller bearing 308 are the primary components of rotary actuator 300. Secondary components include bearings 328, 332 and 326. The remainder are stationary, machined components.

Even though rotary actuator 300 is able to provide very high power density in a very small package, it can be adapted to a wide range of application requirements by means of minor design changes, such as numbers of gear teeth, motor winding characteristics and current and voltage levels, as examples. The inherent simplicity and versatility of rotary actuator 300 enables mass production of most of the subcomponents, thereby providing economies of scale and attendant cost reductions. The characteristics of a particular embodiment of rotary actuator 300 may be scaled to one of a number of pre-selected standardized sizes, in order to provide an "off-the-shelf" solution to the system designer. In one example of a standardized set of such actuators, sixteen separate standardized scaled actuators can be provided to meet a wide range of design applications. A set of actuators of the type shown in FIG. 3 may be constructed according to standard sizes. As one example, a set of sixteen actuator sizes spanning from 0.25" diameter up to 45" in diameter could support the construction of a large population of machines, rapidly assembled and made operational as needed.

Simplicity not only brings with it lower cost, it also results in components that are forgiving in their design, manufacture and operation. In particular, rotary actuator 300 should be relatively insensitive to rather large variations in temperature.

The use of a hypocyclic gear train wherein up to fifteen gear teeth or more can be in contact at a given time brings with it the ability to carry very heavy loads, eliminate backlash, minimize lost motion and resist high levels of shock with relatively modest levels of gear tooth stress, thereby providing both high endurance and reduced wear.

The number of design parameters is rather low. They are, to a great extent, independent choices, and each has clear and explicit meaning to the designer. Hence, not only is rotary actuator 300 exceptional in performance in terms of weight, volume, endurance, output inertia, and power density, it is easily understood by most designers, helping to assure its acceptance in the design community.

As described above, the eccentric offset e within the hypocyclic gear train is driven by an electric prime mover and supported by a bearing on a stationary shaft. Given $N_1$, $N_2$ to be the gear tooth numbers for the bull and sun gears, respectively, and $N_1^1$, $N_2^1$ those associated meshing gears on the wobble planet, then the total gear train ratio is given simply by $r=(N_1^1 N_2)/(N_1^1 N_2 - N_1 N_2^1)$.

The ratio can range from 10-to-1 up to 5000-to-1, the higher ratios depending on the choice of gear tooth geometry that can be designed for high load capacity, low noise, high precision, or low cost depending on the application. In certain embodiments, the appropriate ratio can be attained using meshing gears wherein the number of teeth between the two varies by a single tooth.

In connection with the hypocyclic gear train shown in FIG. 3, the wobble gears 310 and 312 are disposed side-by-side. This construction has a tendency to improve rigidity. For lower gear train ratios, the diameter of gear 310 may differ by as much as 30% or more from the diameter of gear 312. In such a case, gears 310 and 312 may be disposed with one inside the other, so that all gear meshes occur in a single plane.

Not only can the hypocyclic gear train be directly plugged into any of the epicyclic designs, its key design parameters are always visible to the designer, thereby removing the aura of black magic in this area of design. Since the planet gear wobbles, it must be balanced by a counterweight. In many embodiments, the mass of the counterweight required is small relative to the mass of the planet gear itself. In one embodiment, the planet gear is balanced by drilling a small hole in the body of the planet gear.

FIG. 4

Figure 4:
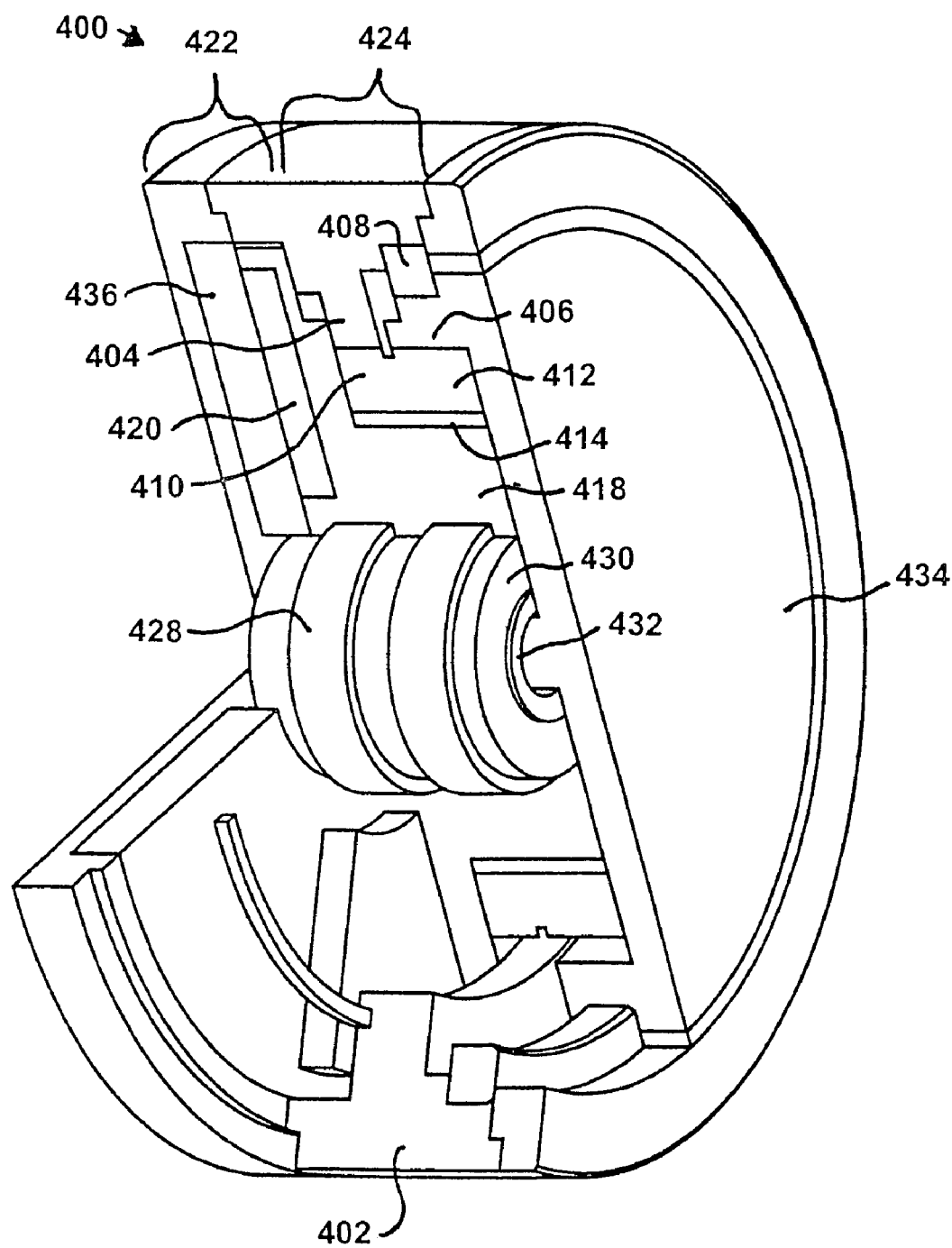
FIG. 4 is a cutaway isometric view of a rotary actuator in accordance with a fourth embodiment of the present invention.

Rotary actuator 400, shown in FIG. 4, incorporates a central stationary shaft 430 holding support bearings 428 that support the rotating motor armature 420 that drives the eccentric 418. Support bearings 414 on the eccentric 418 drive the wobble cylinder, which contains the planetary gears 410 and 412 that mesh with the bull gear 404 and sun gear 406 separated by the principal cross roller bearing 408.

Rotary actuator 400 employs a pancake configuration that incorporates an SRM prime mover 422 to produce a high torque/low speed rotary actuator 400.

Bearing 432 in the output attachment plate 434 supports the end of the stationary shaft 430. Seal 438 separates the output attachment plate 434 from the shell 402 and protects the cross roller bearing 408 from the elements.

FIG. 5

Figure 5:
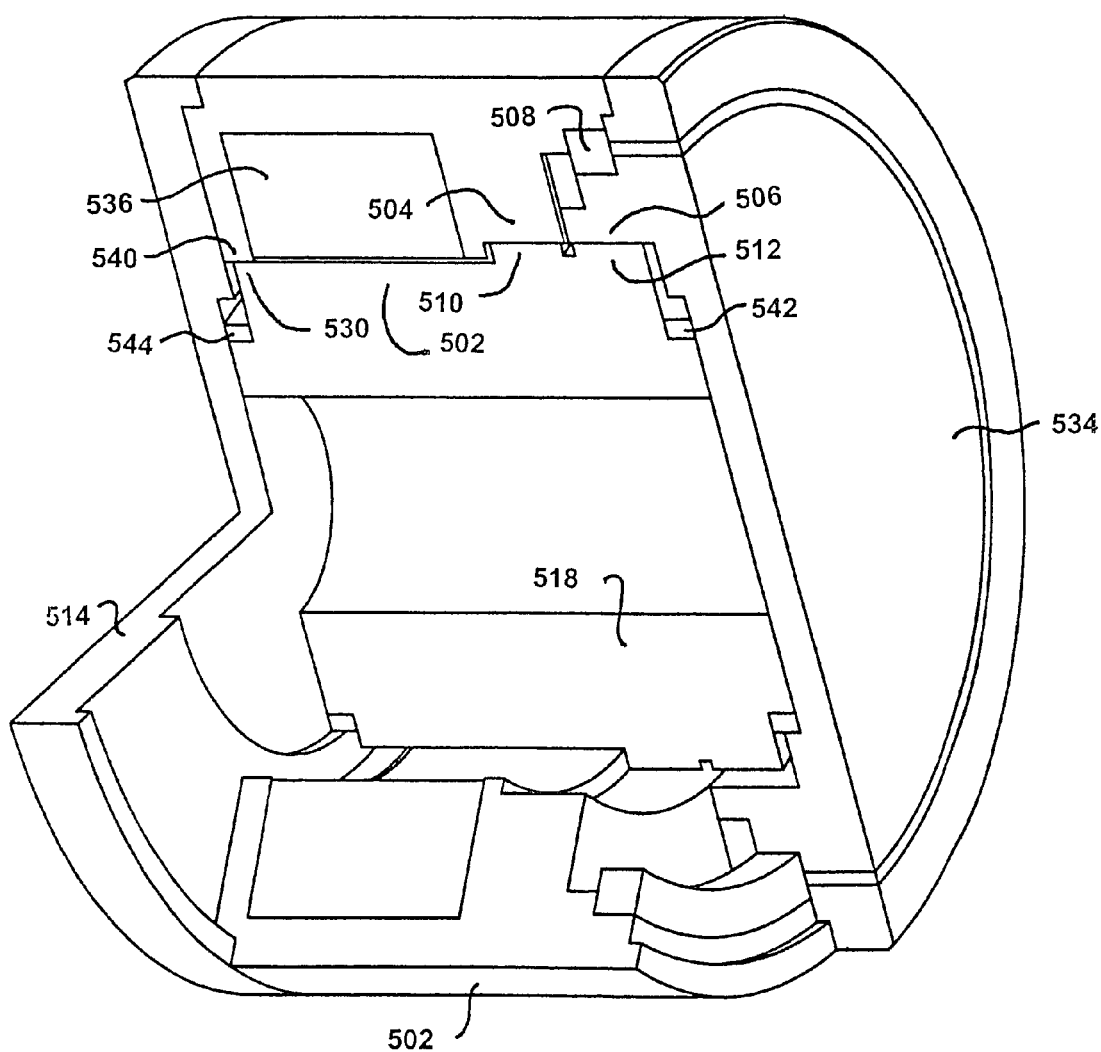
FIG. 5 is a cutaway isometric view of a rotary actuator in accordance with a fifth embodiment of the present invention.

FIG. 5 depicts a fifth embodiment of a rotary actuator 500 in accordance with certain embodiments of the present invention.

This geometrically different format for a hypocyclic actuator concept is shown in FIG. 5 and generally designated 500. As seen in FIG. 5, the bull gear 504 and stator 536 of actuator 500 are rigidly connected to the outer shell 502 and closed at the end by end plate 514.

Armature 520 contains wobble plate gears 510 and 512, which mesh with bull gear 504 and sun gear 506. Sun gear 506 is separated from bull gear 504 by the principal cross-roller bearing 508, which also may function as the principal bearing for the joint of the machine into which rotary actuator 500 is incorporated.

As seen in FIG. 5, the bull gear 504 and stator 536 of actuator 500 are rigidly connected to the outer shell 502 and closed at the end by end plate 514.

Rotary actuator 500 further incorporates bearings 542 and 544 to preload the mesh of the wobble plate gears 510 and 512, so as to ensure that they do not separate and to reduce vibration and the effect of wear.

Bearings 542 and 544 are centered on a second eccentric offset of e, 180° out of phase with the wobble armature eccentric 518. Bearings 542 and 544 roll on cylindrical surfaces machined into the end plate 514 and output plate 534, both of which are concentric with the centerline of the rotary actuator 500.

The high torque, low output velocity rotary actuator 500 shown in FIG. 5 is a combination of a hypocyclic switched reluctance motor, which may generate up to five times higher torque than a standard switched reluctance motor, and a hypocyclic gear train, which may have up to five times higher load capacity than a similar epicyclic gear train. Accordingly, rotary actuator 500 can be said to have, in certain embodiments, an enhanced performance envelope up to 25 times higher than prior designs.

This overall performance enhancement factor of 25 is achieved in rotary actuator 500 with five basic parts, the removal of five additional ancillary bearings and few, if any, components incorporating dimensions having any critical tolerances.

In rotary actuator 500, the wobble motor armature 520 is incorporated into the same part as the wobble plate gear pair. Rotary actuator 500 incorporates a number of distinct advantages over prior designs, including:

The need for only one principal cross-roller bearing 508 and two ancillary bearings 542 and 544;

Simplified controller technology owing to the fact that each stator pole is switched on and off only once in a wave as the armature 520 walks through an angle of 360 degrees×e (where e is the eccentricity of the wobble configuration) during each electrical cycle.

The result of the above is a form of magnetic gearing where the electric cycle occurs at an angular velocity rate of 1/e relative to the rotational velocity of the armature 520. Given an angular velocity of the electrical field and the wobble speed $w_f = w_e = 6667$ with e=0.015, for example, the output attachment plate 534 would rotate at 100 RPM and the output velocity, $w_o$, would equal 1 RPM given a gear reduction ratio of 100. Because of this electrical wave, torque ripple is virtually non-existent. Also, given a value of e=0.015, a balancing mass at r=30e means that only 1/900, or 0.111%, of the mass of armature 520 needs to be removed to perfectly balance armature 520. The attributes of actuator 500 are such that certain variations of this design may be employed effectively as a backdriveable generator to produce energy from a mechanical power source, such as a wind turbine.

For at least the embodiments shown in FIGS. 3–5, each gear tooth can be profiled to be slightly preloaded as it comes into its central position, in order to reduce the generation of lower-order harmonics and control backlash and lost motion. This preloading can be accomplished through the introduction of a slight interference between that tooth and the mating teeth as that tooth comes into its central position. In certain embodiments, a cavity may be introduced within each wobble gear tooth in order to tailor the stiffness of the teeth and reduce closing noise.

Figure 9:
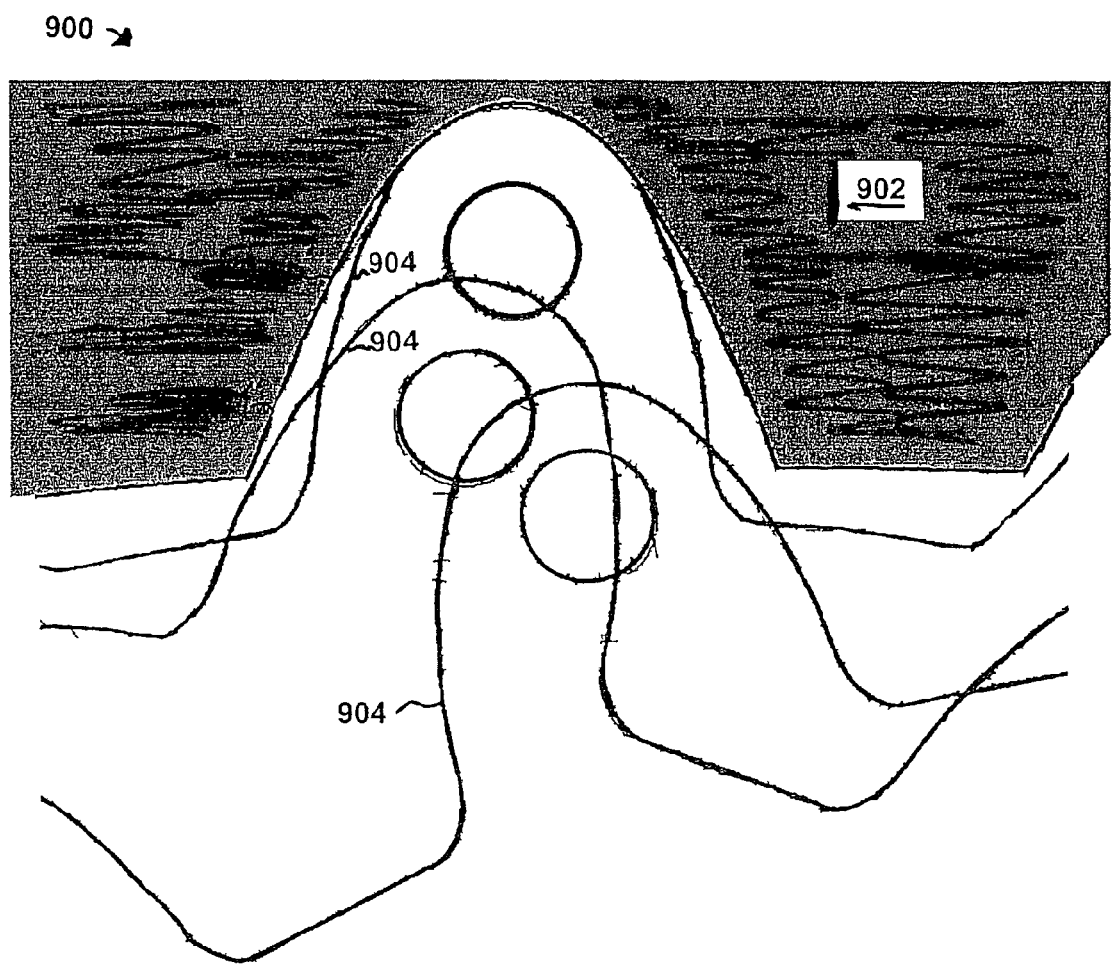
FIG. 9 is a side view of a circular arc gear tooth mesh in accordance with certain embodiments of the present invention.

FIG. 9 shows the sequence of motion, within a sun/bull gear mechanism 900, of a sun gear tooth as it enters and exits its central position within the body of the stationary bull gear 902.

The initial position of the sun gear tooth at time T0, prior to engagement with the bull gear 902 is designated 904. The central position of the sun gear tooth at time T1, some period of time after time T0, is designated 904'.

In certain embodiments, the geometry of mechanism 900 may be such that a slight interference is encountered as the sun gear tooth moves into the central position 904'. In such embodiments, the gear tooth stiffness and the level of interference in the central position 904' will determine the forces generated by the elastic deformation of the bull gear 902 and the top of the sun gear tooth. This interference will tend to reduce or eliminate any free motion in any of the bearings supporting the sun gear. It can be seen in FIG. 9 that the sun gear tooth shown incorporates a cavity in order to reduce its stiffness, as will be described in more detail below in connection with FIGS. 10–12.

After time T1, at which point maximum interference and deformation, if any, occur, the sun gear tooth will move out of engagement with the bull gear 902. The position of the sun gear tooth at a point in time T2 after time T1 is designated 904".

Figure 10:
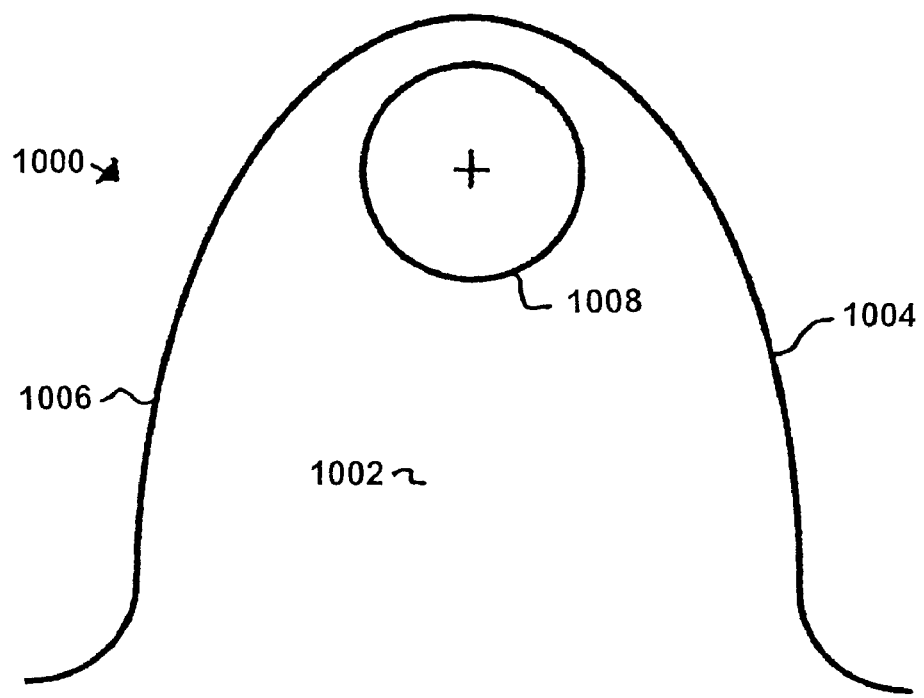
FIG. 10 is a side view of a single circular arc gear tooth in accordance with certain embodiments of the present invention.
Figure 11:
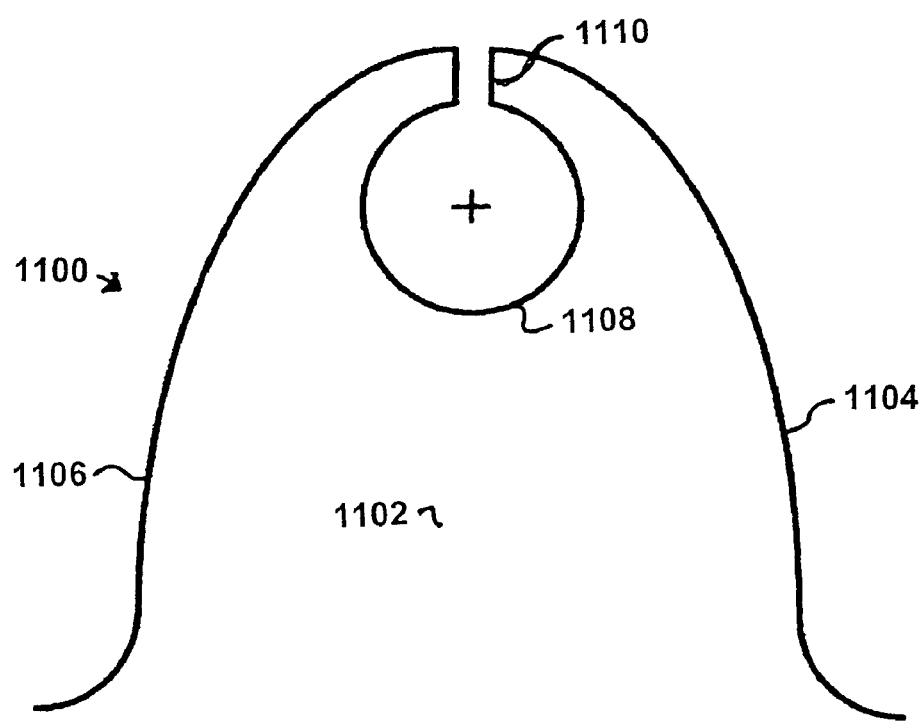
FIG. 11 is a side view of a single circular arc gear tooth in accordance with certain embodiments of the present invention.
Figure 12:
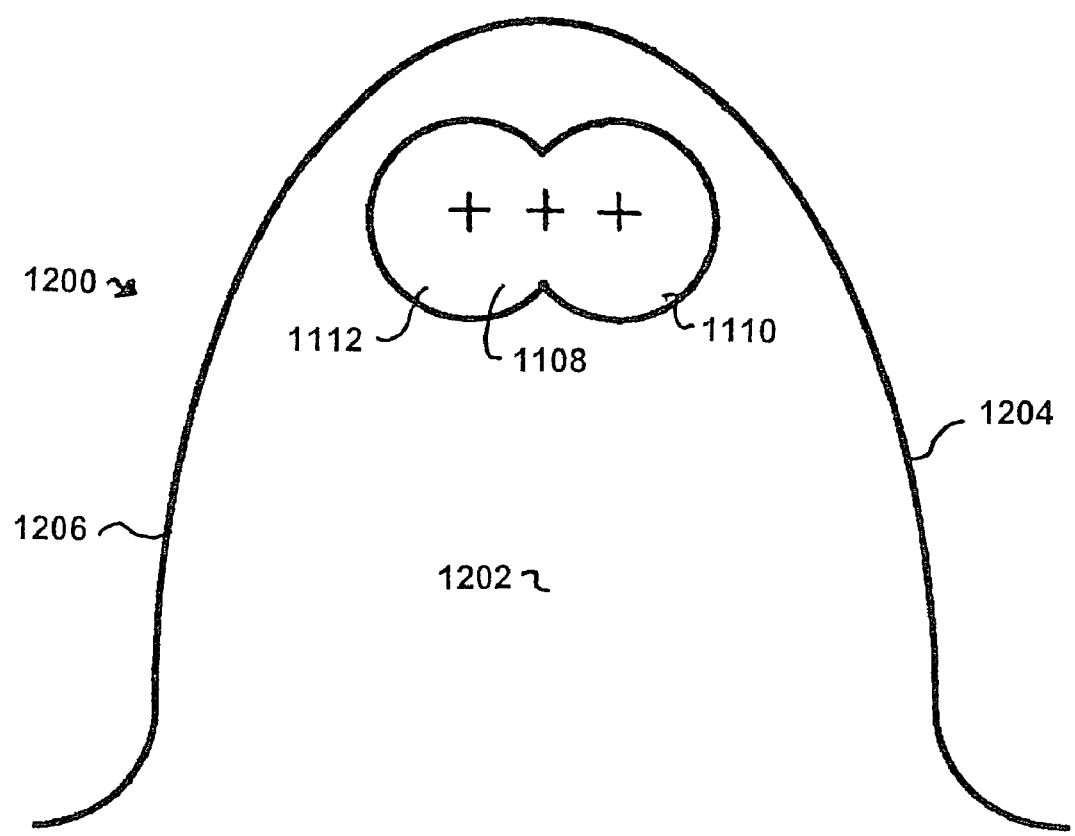
FIG. 12 is a side view of a single circular arc gear tooth in accordance with certain embodiments of the present invention.

Examples of gear tooth geometry useful in connection with gear mechanism 900 and similar gear mechanism are shown in FIGS. 10–12. FIG. 10 depicts a side view of a circular arc gear tooth 1000 having a body 1002, and first flank 1004, a second flank 1006, and a circular cavity 1008 disposed at the top of the body 1002. The position and diameter of cavity 1008 will be determined by the requirements of a particular application. In general, the stiffness at the peak of gear tooth 1000 will be reduced as the diameter of the cavity 1008 is increased or its central axis is moved closer to the peak of gear tooth 1000. Reducing the diameter of the cavity 1008 or moving it further down into the body 1002 will have the opposite effect, tending to stiffen the peak of gear tooth 1002.

FIG. 11 depicts a side view of a circular arc gear tooth 1100 having a body 1102, and first flank 1104, a second flank 1106, and a circular cavity 1108 disposed at the top of the body 1102. Gear tooth 1100 further incorporates a slot 1110 at the top of circular cavity 1108, so as to reduce the rigidity of the top of the body 1102 of gear tooth 1100.

FIG. 12 depicts a side view of a circular arc gear tooth 1200 having a body 1202, and first flank 1204, a second flank 1206, and a cavity 1208 disposed at the top of the body 1202. Cavity 1208 is composed of two circular cavities 1110 and 1112, which overlap in the center of gear tooth 1200. This design preserves the local stiffness at the top of the gear tooth 1200.

In the embodiments described above, the tooth ends may need more ductility than the remainder of the tooth surface, which should generally be hardened. In certain embodiments, the cavity or cavities may be drilled and/or slotted before hardening. The tooth surface may then be hardened. The tooth tips may be annealed locally to improve the fatigue resistance at the deforming part of the tooth. This annealing may, in certain embodiments, be performed by a laser.

For at least the embodiments shown in FIGS. 3–5, the following additional specific comments apply:

- In certain embodiments, the gear teeth are circular gear teeth in order to enhance smoothness, reduce noise from gear tooth impact and reduce the contact Hertzian stress. In other embodiments, triangular gear teeth may better satisfy the application requirements. In other embodiments, specialized gear tooth geometry may be included where unique application requirements must be met.
- Wiring may be disposed entirely in the stationary stator as part of the outer shell and bull gear.
- The force path through the actuator is short.
- Armatures may be solid or laminated metal.
- Few, if any, critical dimensions are required, thereby reducing the influence of manufacturing tolerances and temperature variations on performance.
- The use of short gear teeth reduces bending stresses and reduce friction losses.
- The meshing of up to thirty teeth picks up and releases the load slowly to reduce noise.

FIG. 6

Figure 6:
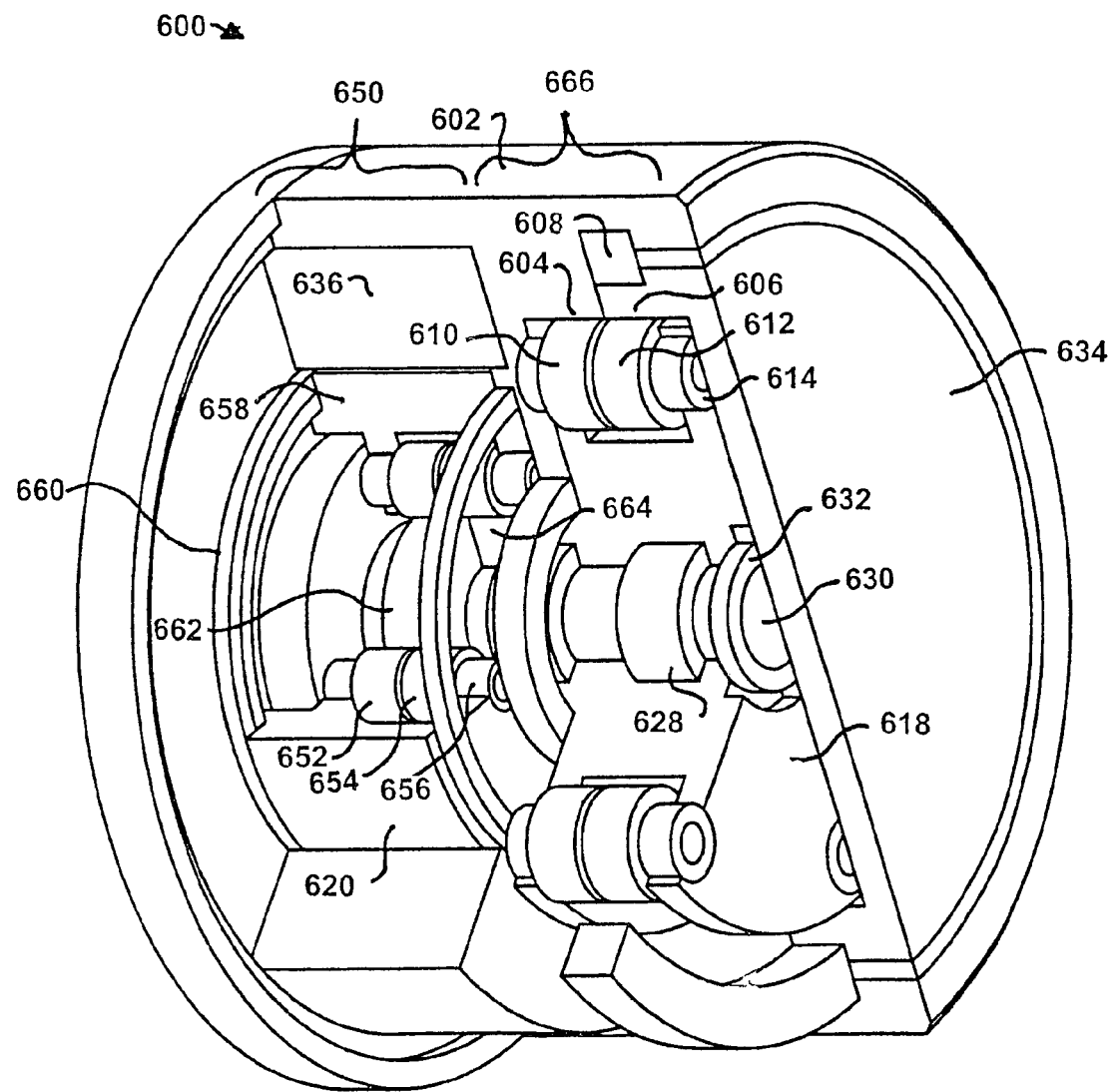
FIG. 6 is a cutaway isometric view of a rotary actuator in accordance with a sixth embodiment of the present invention.
Figure 7:
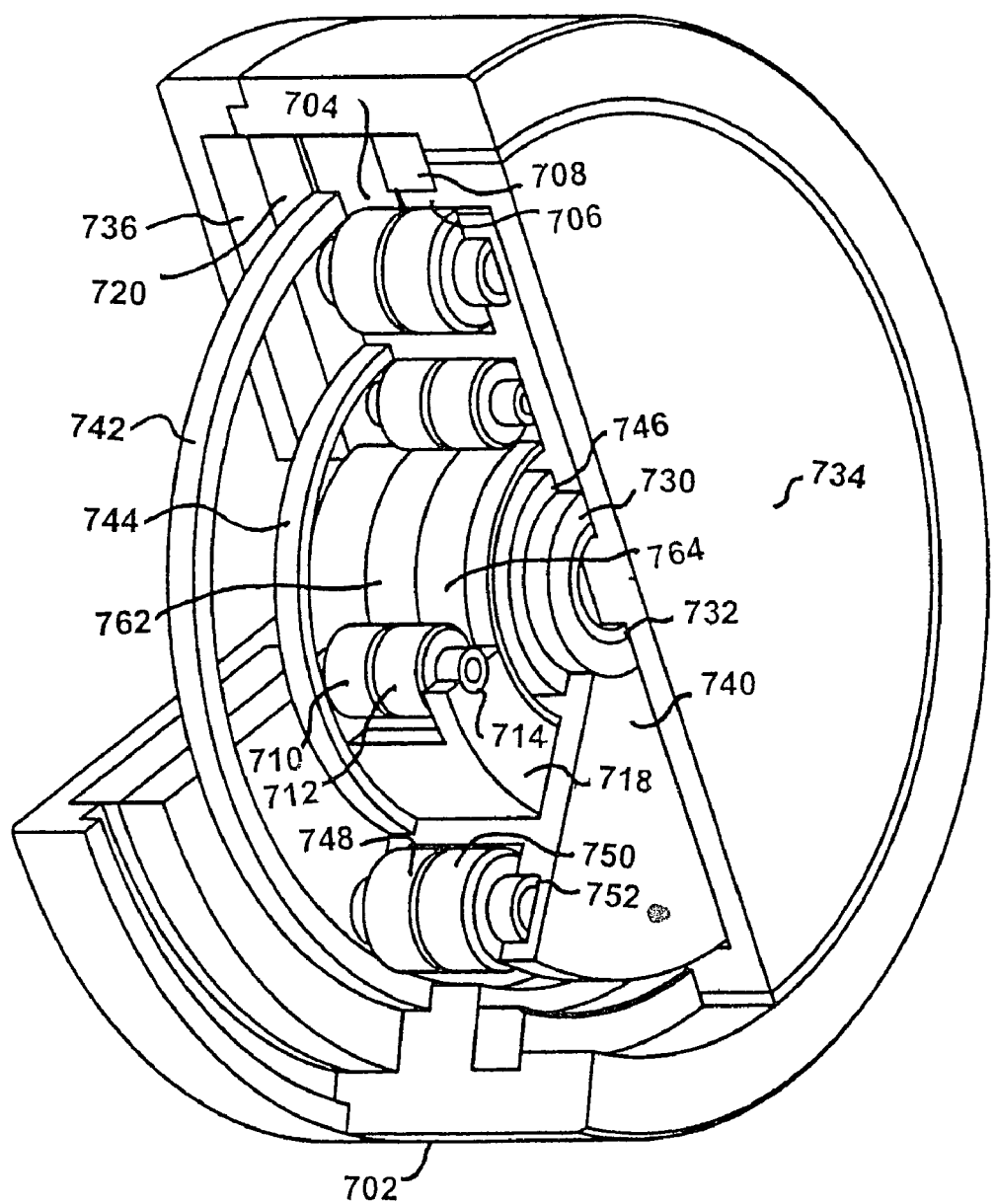
FIG. 7 is a cutaway isometric view of a rotary actuator in accordance with a seventh embodiment of the present invention.

Certain applications may require a rugged rotary actuator with a stiff output gear train of high reduction ratio in a compact configuration. Depending on the specifics, such an actuator may be driven either by a pancake switched reluctance motor (SRM) prime mover or a cylindrical brushless D.C. Motor (DCM). FIGS. 6 and 7 are cutaway isometric views of these alternate embodiments.

Rotary actuator 600 of FIG. 6 has a "coffee can" profile, while rotary actuator 700 of FIG. 7 has the shape of a circular pancake disk. Rotary actuator 600 is designed for use in robotics, while rotary actuator 700 is useful in confined spaces between two walls. Both rotary actuators 600 and 700 are capable of producing relatively high torque at relatively low speeds. All other things being equal, rotary actuator 600 will generally have a higher maximum speed than rotary actuator 700 and a somewhat lower maximum torque.

FIG. 6 is a cutaway isometric view of a rotary actuator 600 with the first stage of the epicyclic gear train 650 inside the magnet cylinder 620 of the relatively high speed D.C. motor field 636. The planets 652 and 654 ride on bearings 656 in a planet cage 658 attached to the magnet cylinder 620, which, in turn, rides on bearings 660. This embodiment is ideal for use in dextrous machines.

Planets 652 and 654 may form a Fergeson paradox configuration driving moving external sun gear 664 and stationary external bull gear 662 attached to the central shaft 630 of rotary actuator 600. Central shaft 630 is attached to the outer shell 602 using machine bolts.

In certain embodiments, the first stage may be designed to reduce its inertia, as it experiences higher speeds and lower torque. Planetary gears 652 and 654 may be made relatively narrow and still carry the necessary load. The specific design parameters of these planetary gears 652 and 654 are dictated by the application.

There will be a trade off between the size of the motor components 620 and 636 and the outer diameter of the first stage gear train 650. The smaller the internal diameter of magnetic cylinder 620 and field 636, the larger the torque produced. The stationary shaft 630 is long in this design and subject to flexure. It is, therefore, supported by bearing 640.

Sun gear 664 is rigidly connected to the driving cage 618 of the second stage epicyclic gear train 666 riding on large needle bearings 628 carrying planet gears 610 and 612 riding in bearings 614. These planet gears 610 and 612 mesh with stationary internal bull gear 604, which is attached to the outer shell 602, and internal sun gear 606 attached directly to the output attachment plate 634.

Seal 668 separates the attachment shell 602 from the plate 634. Sun gear 664 and its planet cage 658 support a bearing 670, which is held in place by the outer shell 602. The shape of outer shell 602 supporting bearing 670 not only strengthens the outer shell 602 but also improves the rigidity of the central stationary shaft 630.

Internal sun gear 606 is rigidly attached to the output attachment plate 634, which contains bearing 632, to further strengthen the output structure of rotary actuator 600.

The second stage 666 of the epicyclic gear train uses an internal bull gear 604 and sun gear 606. This arrangement conforms to the basic configuration of the structure, minimizing weight while at the same time making rotary actuator 600 particularly rugged and stiff.

In the second stage 666, the velocities are lower so the concern for inertia goes down accordingly, but the regard for stiffness and load capacity go up. Hence, the size of the gear teeth in the second stage 666 must meet the requirement for load as a first priority, with stiffness as a second priority. This may require, in certain applications, the use of as many planets 610 and 612 as the geometry will allow.

The principal bearing in this configuration is the cross roller bearing 608. It separates bull gear 604 and shell 602 from sun gear 606 and output attachment plate 634. Bearing 608 also performs the load bearing tasks for the machine using this actuator. Because of the position of bearing 608, bull gear 604 can be made very stiff, as can sun gear 606. For maximum stiffness and minimum deflection under load, the attachments to the neighboring links should be made close to bearing 608.

FIG. 7

FIG. 7 depicts, in a cutaway isometric view, an embodiment of a rotary actuator 700 the present invention configured for a relatively low speed pancake SRM, which produces relatively high torque. The bull gear 704 is made especially strong and is rigidly attached to the attachment shell 702 and supporting bearing 732 to the primary stationary shaft 730, so as to further strengthen the output attachment plate 734 for this design.

Magnet disk 720, in concert with field 736, directly drives the first stage planet cage 718 for planet gears 710 and 712, which are supported in bearings 714. Planet cage 718 must be carefully designed to accommodate the planet gears 710 and 712 while maintaining sufficient structural integrity.

The second stage planet cage 740 is driven by, and rigidly attached to, sun gear 764, which is supported by three bearings 742, 744 and 746 in order to maximize its support. This support is incorporated to resist twisting moments generated by the second stage planets 748 and 750 supported in bearings 752. The first stage sun gear 764 and bull gear 762 are external gears. Bearing 732 supports the first planet gear cage 718 in the moving sun gear 764, which drives the second planet gear cage 740.

The second stage sun gear 706 and bull gear 704 are internal gears. This arrangement serves to match the structural geometry of the rotary actuator 700 so as to stiffen the structure. Sun gear 706 and bull gear 704 are separated by the principal cross-roller bearing 708 which acts as the principal bearing in the gear train while also serving as the principal bearing of the joint into which the rotary actuator 700 is incorporated. In order to maximize rigidity, the attachments to the outer attachment shell 702 and to the output attachment plate 734 should be placed close to cross-roller bearing 708.

Since the bull gear 704 and sun gear 706 in the second stage are relatively large in diameter, they are able to accommodate more planets 748 and 750 and larger gear teeth. Accordingly, planet gears 748 and 750 are shown to be relatively large as compared to planet gears 710 and 712 in FIG. 7.

Because of the lower speeds encountered in the second stage gear train, concern for inertia is superseded by a concern for the load capacity of the gear teeth. This is also true, to a lesser extent, in the first stage of the gear train. The outer envelope of the first stage is smaller in diameter than the outer envelope of the second stage, which is appropriate since it carries less load but operates with larger angular velocities.

FIG. 8

Figure 8:
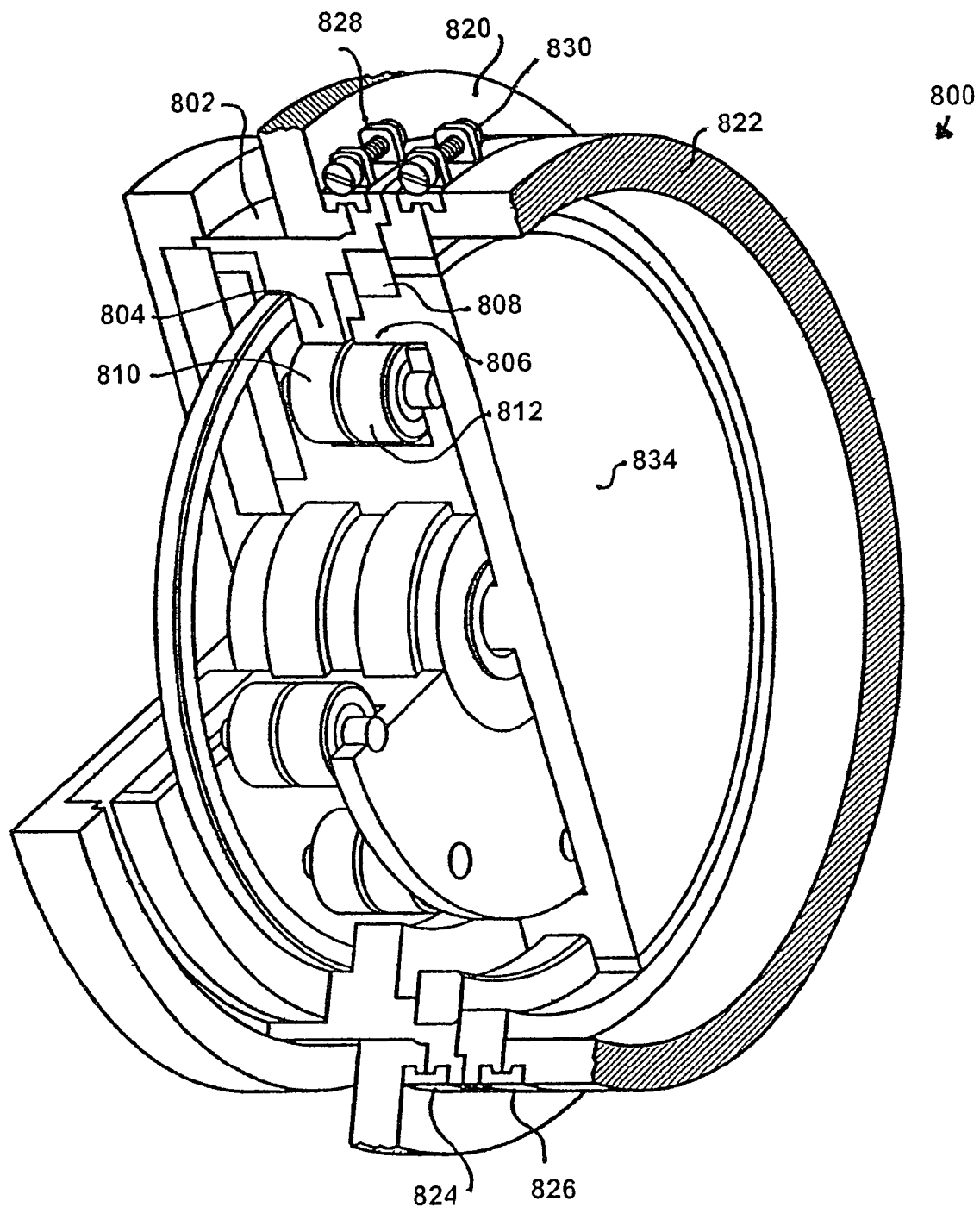
FIG. 8 is a cutaway isometric view of a rotary actuator in accordance with certain embodiments of the present invention.

FIG. 8 depicts a rotary actuator 800 incorporating a quick-change attachment architecture in accordance with certain embodiments of the present invention. Rotary actuator 800 incorporates an actuator shell 802 containing a bull gear 804, and sun gear 806, separated by a cross-roller bearing 808. Planet gears 810 and 812 mesh with bull gear 804 and sun gear 806, respectfully.

As seen in FIG. 8, actuator 800 rigidly connects a first mechanical link 820 to a second mechanical link 822. First mechanical link 820 is rigidly connected to actuator shell 802 by a first wedge clamp 824, while second mechanical link 822 is rigidly connected to output attachment plate 834 by second wedge clamp 826. In one embodiment, each of wedge clamps 824 and 826 takes the form of a pair of semi-circular wedge clamp halves tightened against actuator 800 by an external band clamp. Other equivalent structures may, of course, be employed without departing from the spirit and scope of the present invention.

In the embodiment shown in FIG. 8, wedge clamps 824 and 826 are tightened by a pair of tensioning mechanisms 828 and 830. Depending on the particular application, tensioning mechanisms 828 and 830 may be integral to the wedge clamps 824 and 826, or they may be integral to separate band clamps disposed around wedge clamps 824 and 826.

Each of wedge clamps 824 and 826 incorporates a pair of generally-conic internal surfaces, together forming a groove about the internal surface of the wedge clamp 824 and 826. The internal profile of each of these internal surfaces conforms to a mating external surface on either the actuator 800 or one of the mechanical links 820 and 822. As the tensioning mechanisms 828 and 830 are tightened, the normal force between the generally-conic internal surfaces and the mating external surfaces will draw the mating components together into a tight and rigid mechanical connection. In certain embodiments, the design of wedge clamps 824 and 826 will conform to one of a standard set of sizes. Within each standard size, there may be two or more strength classes, similar to the types of classification employed for standardized threaded fasteners.

Mechanical links 820 and 822 are disposed closely adjacent to one another and to principal cross-roller bearing 808. With the attachment of mechanical links 820 and 822 in this manner, closely adjacent one another and to principal cross-roller bearing 808, it can be seen that the joint rigidly resists motion about five of the six degrees of freedom, with the remaining degree of freedom controlled by the prime mover and gear train combination.

It can be seen that the "force path" through the rotary actuator 800 is extremely short, and passes through a combination of highly rigid mechanical structures and connections and associated rigid structures. This short force path and associated rigid structures enable the rotary actuator 800 to serve as the rotary joint for the machine itself, rather than serving merely as a torque input device, as in prior designs.

It will be appreciated by those of skill in the art that, although the quick-change attachment structures of rotary actuator 800 are shown in connection with a particular embodiment of the present invention, the attachment structures shown in FIG. 8 can be employed in connection with any of the embodiments described herein without departing from the spirit and scope of the present invention. Where simplicity is desired, simple bolt circles may prove adequate where accuracy and repeatability of the interface are not high priorities, or where a quick change of the actuator out of the system is not considered important to the application.

The structures shown and described in connection with FIG. 8 applies to all rotary actuators described herein. The geometry of a machine built from the actuators described herein will be primarily dependent on the members attached to the actuators rather than on the actuators themselves. Depending on the application, the links may be parallel to one another, perpendicular to one another, or disposed at any general spatial orientation to one another. The link geometry provides a machine designer with a great deal of freedom to design the system without the necessity for customized components. The use of standardized componentry can, in many instances, reduce cost, owing to the availability of mass production of both the actuators and the links connecting them. At the same time, a high degree of generality and flexibility can be preserved for the designer, even when using standardized components.

Although preferred embodiments of the invention have been described in detail, it will be understood by those skilled in the art that various modifications can be made therein without departing from the spirit and scope of the invention as set forth in the appended claims.

I claim:
1. A rotary actuator comprising:
an actuator shell;
an eccentric cage, disposed within the actuator shell;
a prime mover having a first prime mover portion rigidly fixed to the actuator shell and a second prime mover portion, rotatable with respect to the first prime mover portion, rigidly fixed to the eccentric cage, and capable of exerting a torque on the first prime mover portion;
a cross-roller bearing having a first bearing portion rigidly fixed to the actuator shell and a second bearing portion, free in rotation with respect to the first bearing portion;
an output attachment plate rigidly fixed to the second bearing portion;
a shell gear rigidly fixed to the actuator shell;
an output gear rigidly fixed to the output attachment plate;
an eccentric, disposed about the eccentric cage, having a first gear portion meshed to the shell gear and a second gear portion, adjacent to the first gear portion, meshed to the output gear;

a first structural link rigidly attached to the actuator shell using by quick-change attachment structure; and a second structural link rigidly attached to the output attachment plate by quick-change attachment structure.

2. The rotary actuator of claim 1 wherein each of the quick-change attachment structures comprises a first radial groove in the structural link, a second radial groove, adjacent to the first radial groove, in the mating portion of the rotary actuator and a radial clamp, extending about the circumference of the first and second radial grooves.

3. The rotary actuator of claim 1 wherein the first structural link is attached to the actuator shell immediately adjacent to the cross-roller bearing and the second structural link is attached to the output attachment plate immediately adjacent to the cross-roller bearing.

4. The rotary actuator of claim 1 wherein one or more of the first and second gear portions employs gear teeth having a circular profile.

5. The rotary actuator of claim 4 wherein the gear teeth having a circular profile are dimensioned to have a slight interference.

6. The rotary actuator of claim 5 wherein one or more of the gear teeth having a circular profile have a cavity disposed therein in order to reduce the stiffness of the gear teeth.

7. The rotary actuator of claim 1 wherein 10 or more gear teeth within one or more of the first and second gear portions are in contact at any point in time.

* * * * *